Dec. 3, 1940.        R. W. WAGNER        2,223,649
GEAR SHIFTER MEANS
Filed Nov. 3, 1939
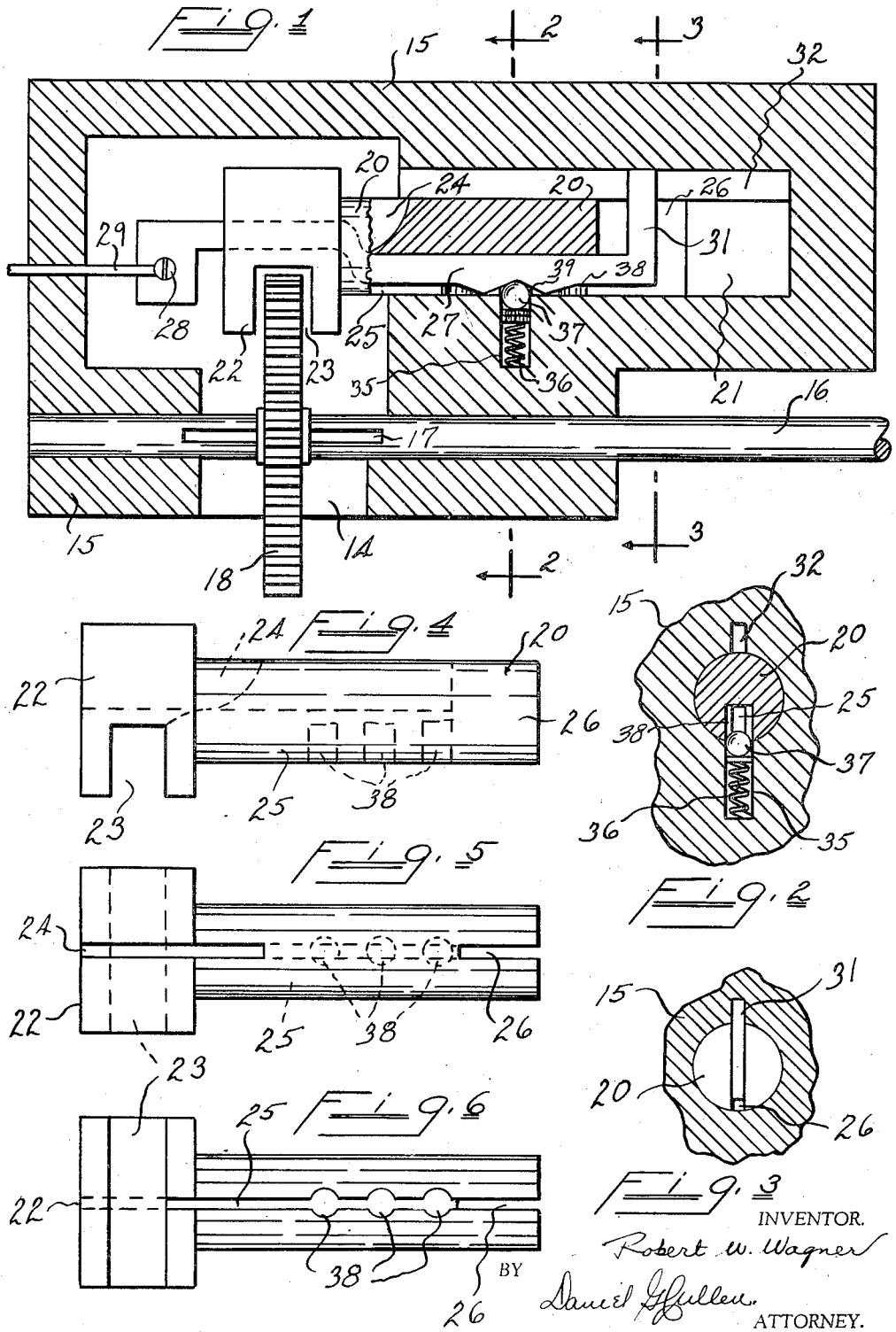
INVENTOR.
Robert W. Wagner
BY
Daniel G. Cullen
ATTORNEY.

UNITED STATES PATENT OFFICE 2,223,649

GEAR SHIFTER MEANS

Robert W. Wagner, Chelsea, Mich.

Application November 3, 1939, Serial No. 302,787

3 Claims. (Cl. 74—475)

This application relates to gear shifter means and positive lock arrangements for the same, and is illustrated in conjunction with a power take-off mechanism useful with motor vehicle transmissions.

The prior art contains power take-off mechanisms useful with motor vehicle transmissions. In these mechanisms, there is provided a manually operable means for shifting the gear thereof, and in this application I disclose a novel gear shifter arrangement for shifting the gear of a power take-off mechanism, and I also show a novel positive lock arrangement for the gear shifter means, whereby the gear will be locked in any indexed position against shifting.

For an understanding of the mechanism herein disclosed, reference should be had to the appended drawing. In this drawing, Figure 1 illustrates a power take-off mechanism employing my novel gear shifter means and positive lock arrangement.

Figures 2 and 3 are fragmentary cross sections on corresponding lines of Figure 1.

Figures 4-6 show a part of the means.

A motor vehicle transmission consists of a casing within which are gears and which has an opening in one side thereof adapted to be aligned with an opening 14 in a casing 15 of a power take-off mechanism. Suitably supported in bearings of the casing 15 is a power take-off shaft 16 upon which is slidably and non-rotatably mounted, as by means of a key 17, a gear 18 which may be shifted along the shaft 16 so as to occupy a neutral position between the gears of the transmission or to be engaged selectively with such gears.

For sliding the gear 18 left and right on its shaft 16 there is provided the novel gear shifter means and positive lock arrangement of this application. This arrangement includes a gear shifter means 20 in the form of a round hollow rod having its shank slidably disposed in the slideway 21 of the casing 15. The free or exposed end 22 of the rod 20 is provided with a cross slot 23 in which may be disposed the peripheral edge of the gear 18 whereby, when the rod 20 is shifted left and right in its slideway 21, it will cause the gear 18 to slide left and right on its keyway 17.

The rod 20 is provided with three additional separate and distinct slots. An upper slot 24 extends from the left end 22 of the rod to a point approximately midway between the ends of the rod and the slot 24 is deep enough so as to extend to the base of slot 23. A lower slot 25 of a depth to reach the base of the slot 24 extends from the cross slot 23 to the small end of the rod 20. In such small end is a transverse end slot 26.

Disposed within slots 24—25—26 of the rod is a cam in the form of a flat bar 27 which is bent so that a part of it lies within the upper slot 24 and a part lies within the lower slot 25. The left end of the bar, projecting beyond the end 22 of the rod 20, is secured as at 28 to a push-pull Bowden wire 29 terminating in a handle which may be at any convenient point of the vehicle. The right end of the bar 27 is bent to provide a key 31 which projects through the upper portion of the end slot 26 of the rod and seats in a groove or keyway 32 in the upper wall of the slideway 21 whereby relative rotation of the assembly of the rod and bar with respect to the casing 15 will be prevented, without however interfering with relative longitudinal movement of that assembly with respect to the casing.

Formed in the casing 15 is a recess 35 containing a coiled compression spring 36 reacting against a ball detent 37 adapted to be projected into a selected one of three holes 38 formed in the rod 20 at slot 25 and projecting radially from the lower surface thereof, co-axially with the lower slot 25. For controlling the ball detent 37 there are provided three hill and valley notches 39 in the lower edge of the cam 27.

The use and operation of the gear shifter means and positive lock arrangement is as follows: Assume the parts to be in the neutral position of Figure 1. Ball detent 37 is in the center hole 38 to lock the rod and gear against shifting and is aligned with the center notch 39 of the cam. Key 31 is spaced from the left end of slot 26. Rod 20 and the enlarged end 28 of cam 27 is spaced from the end 22 of the rod. Movement of the cam 27 in either direction from its neutral position will first cause the ball detent 37 to be biased downwardly and out of center hole 38 of the shifter rod to unlock that shifter rod and permit it to slide with respect to the casing, due to the later engagement between the cam and the shifter rod, caused by engagement of either key 31 or end 28 of the cam with the end of the rod, lost motion travel being determined by the distance between key 31 and the left end of slot 26 of the rod and between cam end 28 and rod end 22.

When the rod is moved by the cam, shortly after the cam had released the rod from the detent, a different hole 38 of the rod will align with the detent and thereupon the detent will be urged into such hole once more to lock the rod against sliding with respect to that casing.

It will be observed that the parts are so disposed that when the detent 37 is within a valley notch 39 of the cam one half of the detent is within the hole 38 of the rod and the other half of the detent is still within the hole 35 of the casing 15 and thus the rod and casing are interlocked against relative movement. On the other hand when a hill of the cam 27 aligns with the detent 37, it will force the detent back into the hole 35 and no part of the detent will be within a hole 38 of the rod and thus the rod will be free to slide with respect to the casing.

It will also be observed that by a simple push or pull movement on the Bowden wire 29 the rod is unlocked from the casing first and then moved longitudinally, and then again automatically locked to the casing by the detent. A time delay between each pair of these steps is provided by the lost motion spacing between the ends of cam 27 and the engaged parts of the rod 20.

Now having described the gear shifter and positive lock arrangement herein described reference may be had to the claims which follow for a determination of the invention.

I claim:

1. A gear shifter and positive lock arrangement therefor comprising a gear to be shifted axially, gear shifter means connected to the gear and adapted to be moved longitudinally, for moving the gear axially, for shifting, a detent for said means, a spring for biasing said detent into locking position with respect to said means, a cam for moving said detent out of such locking position, and for releasing said detent so that the spring can move it into locking position, and means for moving said cam longitudinally to and from its detent controlling positions, the gear shifter means and the cam having a positive lost motion interlocking connection formed by transverse projections on the ends of the cam for engaging the gear shifter means and moving it longitudinally whereby movement of the cam, when the detent is in locking position, first moves the detent out of locking position, without then moving the means, and later moves the means for shifting the gear, and then releases the detent so that it can be moved into locking position by the spring.

2. A gear shifter and positive lock arrangement therefor comprising a gear to be shifted axially, a hollow rod connected to the gear and adapted to be moved longitudinally, for moving the gear axially, for shifting, a detent for said rod, a spring for biasing said detent into locking position with respect to said rod, a cam consisting of a bar slidably mounted within said rod for moving said detent out of such locking position, and for releasing said detent so that the spring can move it into locking position, and means for moving said cam to and from its detent controlling positions, the rod and the bar having a longitudinally lost motion interlocking connection formed by transverse projections on the ends of the bar to engage and move the rod longitudinally whereby movement of the bar, when the detent is in locking position, first moves the detent out of locking position, without then moving the rod, and later moves the rod for shifting the gear, and then releases the detent so that it can be moved to locking position by the spring.

3. A gear shifter and positive lock arrangement therefor comprising a gear to be shifted axially, a hollow rod connected to the gear and adapted to be moved longitudinally, for moving the gear axially, for shifting, a detent for said rod, a spring for biasing said detent into locking position with respect to said rod, said rod having holes for receiving said detent, a cam consisting of a bar slidably mounted within said rod and formed with hill and valley notches in an edge thereof for moving said detent out of such locking position, and for releasing said detent so that the spring can move it into locking position, and means for moving said cam to and from its detent controlling positions, the rod and the bar having a positive lost motion interlocking connection formed by transverse projections on the ends of the bar to engage and move the rod longitudinally whereby movement of the bar, when the detent is in locking position, first moves the detent out of locking position, without then moving the rod, and later moves the rod for shifting the gear, and then releases the detent so that it can be moved to locking position by the spring.

ROBERT W. WAGNER.